United States Patent [19]
Maitani et al.

[11] Patent Number: 5,267,002
[45] Date of Patent: Nov. 30, 1993

[54] DOCUMENT PLATEN DRIVING DEVICE

[75] Inventors: Yoshifumi Maitani; Naoyuki Kamei, both of Yamatokoriyama; Yoshiaki Ibuchi; Mitsuru Ogura, both of Nara; Hidenori Ohnishi, Yamatokoriyama; Minoru Tomiyori, Yamatokoriyama; Yasushi Matsutomo, Yamatokoriyama, all of Japan

[73] Assignee: Sharp Kabushiki Kaisha, Osaka, Japan

[21] Appl. No.: 7,183

[22] Filed: Jan. 21, 1993

[30] Foreign Application Priority Data

Jan. 21, 1992 [JP] Japan .................. 4-8484

[51] Int. Cl.$^5$ .............................................. G03G 15/00
[52] U.S. Cl. .......................................... 355/234; 74/30
[58] Field of Search ............... 355/234, 235, 48, 50; 74/29, 30

[56] References Cited

U.S. PATENT DOCUMENTS

| | | | |
|---|---|---|---|
| 2,821,861 | 2/1958 | Dunn | 74/30 |
| 4,112,840 | 9/1978 | Englund | 74/30 X |
| 4,172,653 | 10/1979 | Bujese . | |
| 4,294,554 | 10/1981 | Mattsson | 74/30 X |
| 4,319,835 | 3/1982 | Navone | 355/50 |
| 4,530,591 | 7/1985 | Mastuyama . | |
| 5,113,225 | 5/1992 | Deguchi | 355/235 |

FOREIGN PATENT DOCUMENTS

| | | |
|---|---|---|
| 56-22205 | 5/1981 | Japan . |
| 57-122458 | 7/1982 | Japan . |
| 61-59321 | 3/1986 | Japan . |
| 62-194056 | 8/1987 | Japan . |

Primary Examiner—R. L. Moses
Attorney, Agent, or Firm—David G. Conlin; George W. Neuner

[57] ABSTRACT

A document platen driving device is provided with an endless gear connected to a document platen, whereon a document is placed, which reciprocates. A sun gear is secured to a fixed station within a space surrounded by the endless rack, and a planetary gear meshing with the endless rack and with the sun gear is also provided within the space. The planetary gear is a double gear composed of a large gear and a small gear having different pitch circle diameters. It is arranged such that the document platen is moved forward by meshing the small gear with the endless rack, and moved backward by meshing the large gear with the endless rack. In this arrangement, the backward moving speed of the document platen can be set faster than the forward moving speed, thereby permitting a reduction of the entire time required for a copying process, especially for a successive copying process.

16 Claims, 16 Drawing Sheets

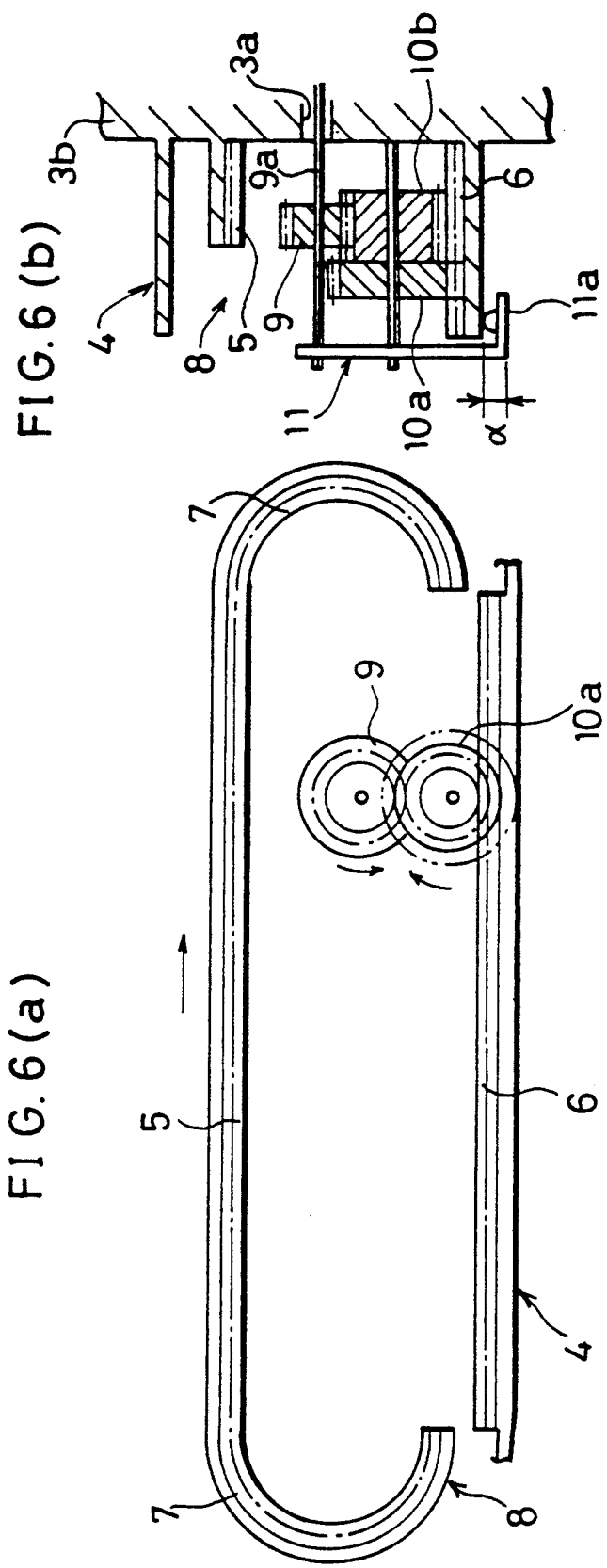

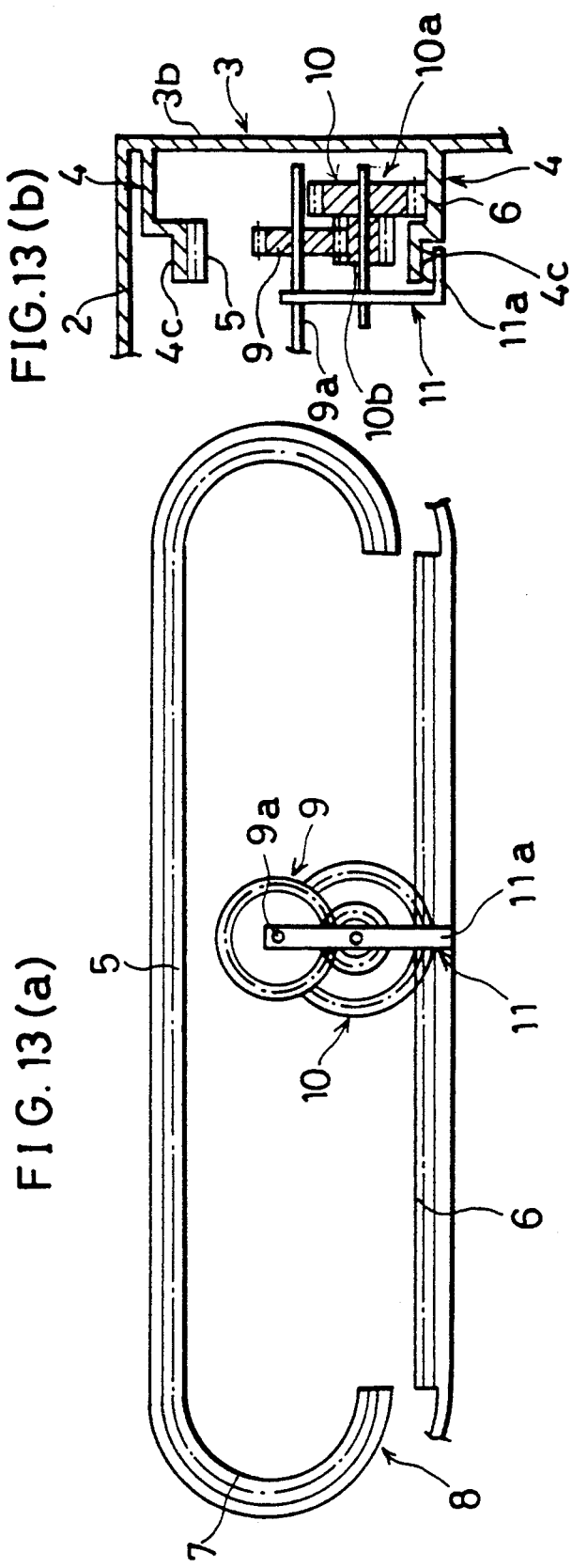

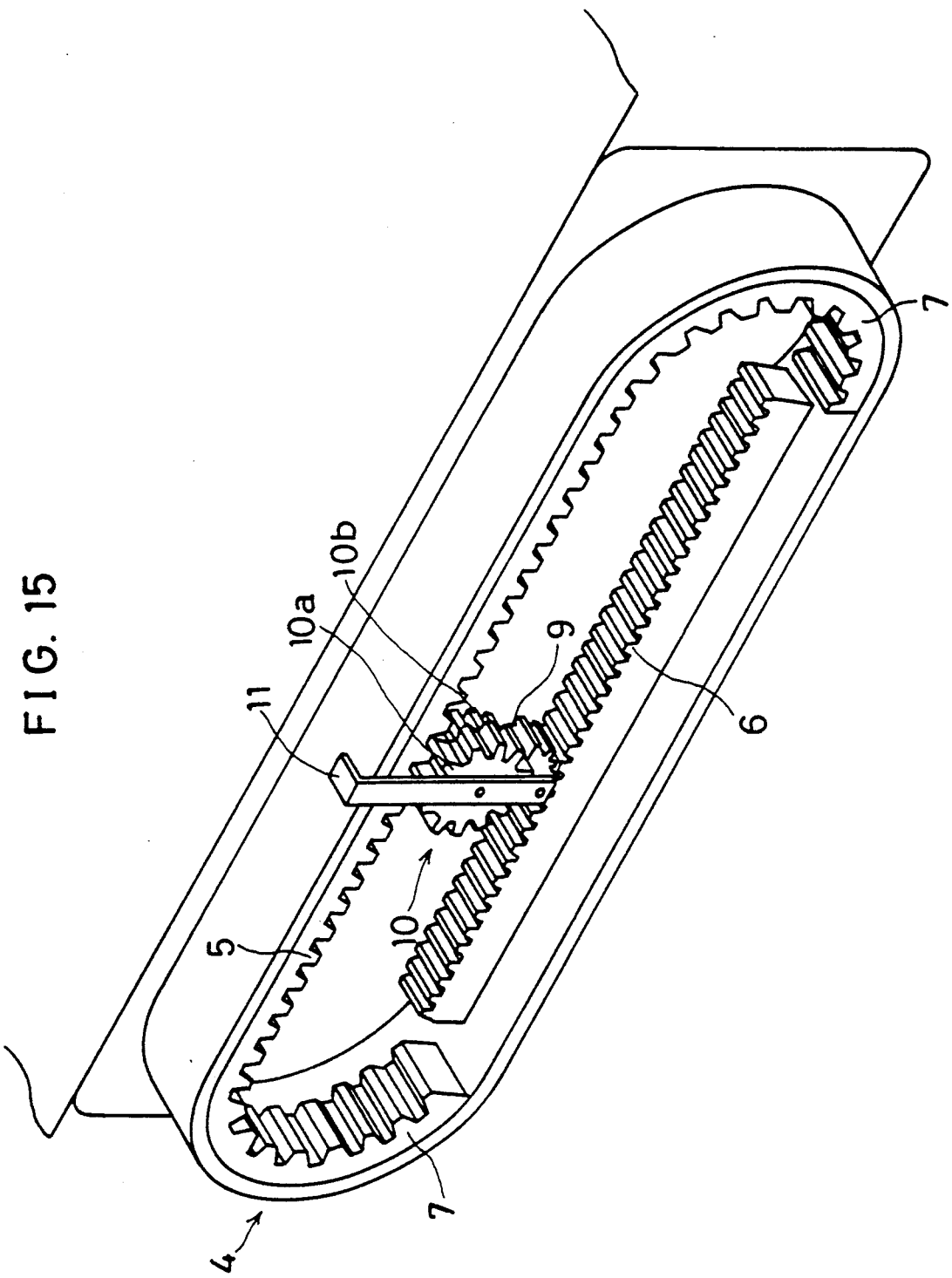

DOCUMENT PLATEN DRIVING DEVICE

FIELD OF THE INVENTION

The present invention relates to a document platen driving device for reciprocating the document platen, provided in a copying machine incorporating a movable document platen which is moved when an optical system scans a document placed thereon.

BACKGROUND OF THE INVENTION

Conventionally, a copying machine incorporating a movable document platen, wherein a document platen for placing thereon a document is moved when an optical system scans the document, has been used. In this type of copying machine, when the optical system scans the document, first, the document platen is moved backward from a stand-by position to a scanning start position. Then, while the scanning is being carried out, the document platen is moved forward until it reaches a scanning end position. Thereafter, the document platen is moved backward from the scanning end position to the original stand-by position.

As shown in FIG. 18, a driving device 151 for moving a document platen 152 is provided under the document platen 152, and has a configuration as shown in FIG. 18. When moving forward (in the direction of arrow F in FIG. 18) the document platen 152 from the scanning start position, a solenoid 153 for forward movement is turned ON. As a result, a latch 154 engages with a crutch brake 156 of a spring crutch 155 for forward movement, thereby actuating the spring crutch 155 for forward movement.

Therefore, the driving force passed to an input gear 157 is first transmitted to an output gear 158, and further transmitted to a platen driving gear 159, thereby moving forward the document platen 152 having a rack which meshes with the platen driving gear 159.

When the platen 152 has reached the scanning end position, a detection switch 160 shown in FIG. 17 detects the arrival of the platen 152 at the scanning end position. Then, the solenoid 153 for forward movement is turned OFF, while a solenoid 161 for backward movement is turned ON. This brings a latch 162 to engage with a clutch brake 163 of a spring clutch 167 for backward movement, thereby actuating the spring clutch 167.

As a result, the driving force passed to the input gear 157 is transmitted to the platen driving gear 159 via a gear 164, an input gear 165, and output gears 166 and 158. Then, the document platen 152 is moved backward (in a direction of arrow R in FIG. 18) to the original stand-by position.

However, with the above-mentioned conventional configuration, in order to achieve reciprocating movement of the platen 152, the spring clutch 155 for forward movement, the spring clutch 167 for backward movement, the solenoid 153 for forward movement, and the solenoid 161 for backward movement, etc., must be provided. In the copying machines incorporating movable document platens, since most of them are compact and economic type, the proportion of these components to the total cost significantly increases, thereby presenting the problem of high manufacturing cost of the copying machine.

The publication of Japanese utility model gazette (Jitsukousho 56-22205) discloses a document platen driving device which includes a loop shaped internal rack, and a pinion which meshes with the internal rack.

However, with the above arrangement of the document platen driving device, the forward moving speed is the same as the backward moving speed. Thus, the above arrangement presents the problem that when carrying out a successive copying process, a long time is required. More concretely, there is a limit in increasing the transport speed and the transfer speed of the sheets in the copying machine in order to ensure the copying quality, and thus there is a limit in increasing the forward moving speed of the document platen. When the forward moving speed of the document platen is the same as the backward moving speed of the document platen, a waiting time for the next copying process becomes long. As a result, a long time is required for the entire copying process.

In order to counteract the above problem, the Laid-open Japanese patent publication (Tokukaisho 57-122458) discloses the document driving device wherein a length of the periphery of a loop-shaped internal rack provided with the document platen can be adjusted according to the document size. With this arrangement, the entire time required for the successive copying process can be reduced for a certain size of the document. However, the complex configuration is required in order to vary the length of the periphery of the rack. Thus, the above arrangement presents the problems that the device becomes larger in size and the manufacturing cost thereof increases. For this reason, in practice, the above document platen driving device cannot be adopted in the compact copying machine.

SUMMARY OF THE INVENTION

It is an object of the present invention to provide a document platen driving device which permits a reduction of the manufacturing cost and a reduction of the entire time required for a copying process especially for a successive copying process.

In order to achieve the above objective, a document platen driving device of the present invention is provided with: movable means connected to the document platen, which includes an endless rack and an endless member, the endless rack having first and second racks that extend in parallel to a moving direction of a document platen, and two semicircular gears that are connected to respective ends of the first rack so that they extend in a circular manner from the ends to respective ends of the second rack, the endless member having a smooth circumferential surface and surrounding the endless rack; driving force generating means for generating a driving force to move the document platen; a sun gear for transmitting the driving force of the driving force generating means to the document platen, the sun gear being secured to a fixed station within a space surrounded by the endless rack; a planetary gear having a large gear and a small gear that have different pitch circle diameters respectively and that are disposed so as to coaxially rotate as one integral part, the planetary gear being meshed with the endless rack as well as being meshed with the sun gear so as to revolve around the sun gear; and a connecting member for supporting and connecting ends of respective rotation shafts of the sun gear and the planetary gear, the connecting member being provided with a sliding section that slides along the circumferential surface of the endless member with the movement of the movable means.

In the above arrangement, the driving force of the driving force generating means is transmitted to the endless rack via the sun gear and the planetary gear. Here, since the sun gear and the planetary gear are coupled to one another by the connecting member, the sun gear and the planetary gear stay in mesh. Further, the sliding section of the connecting member is arranged to slide along the circumferential surface of the endless member that surrounds the endless rack; thus, the planetary gear and the endless rack stay in mesh.

For example, in the case of inputting the driving force of the driving force generating means to the rotation shaft of the sun gear when the large gear of the planetary gear stays in mesh with the first rack, the planetary gear rotates in the reverse direction to the sun gear with the rotation of the sun gear, thereby enabling a linear movement of the endless rack in the rotating direction of the planetary gear. Thus, the document platen, which is coupled to the endless rack, is also linearly moved in a predetermined direction.

Thereafter, as the sun gear is further driven, the large gear of the planetary gear meshes with the semicircular gears of the endless rack. In this case, the planetary gear rotates around the sun gear at virtually 180 degrees, centered on the rotation shaft of the sun gear. Therefore, the positional relationship between the sun gear and the planetary gear is reversed in the vertical direction. During this process, the endless rack is kept in stoppage.

Then, the large gear of the planetary gear and the semicircular gears are cancelled from meshing with one another. The small gear of the planetary gear immediately meshes with the second rack. As the sun gear further rotates in the same direction, the endless rack is moved in the reverse direction to the above direction. According to this movement, the document platen is moved in the opposite direction to the above direction.

As described above, the above arrangement permits a reciprocating movement of the document platen, i.e., a forward movement and a backward movement, by the planetary gear mechanism. This enables an elimination of the necessity of a large number of parts, such as gears, latches, and solenoids, as well as a reduction of the manufacturing cost of the device.

Moreover, since the planetary gear is provided as a double gear including the large gear and the small gear having different pitch circle diameters, the moving speed of the document platen can be changed between the forward movement and the backward movement. More specifically, it is arranged such that the forward moving direction of the document platen is set the direction in which the movable means is moved by meshing one of the first rack and the second rack with the small gear having a smaller pitch circle diameter than that of the large gear; and the backward moving direction of the document platen is set the direction in which the movable means is moved by meshing the other of the first rack and the second rack with the large gear having a larger diameter than that of the small gear. With this arrangement, the backward moving speed of the document platen can be made faster than the forward moving speed of the document platen, thereby permitting a reduction of the entire time required for the copying process, especially for the successive copying process.

Furthermore, since the precision of the moving speed is negligible with respect to the backward movement of the document platen, the precision of the large gear, which is associated with the backward movement of the document platen, can be reduced in comparison with the precision of the small gear, which is associated with the forward movement of the document platen, thereby permitting a reduction of the manufacturing cost of the planetary gear.

Moreover, in the above arrangement of the document platen, the planetary gear is designed such that the small gear is placed closer to the connecting member than the large gear. Thus, the endless member can be formed in such a step-like manner that a circumferential surface of the endless member along which a sliding member slides is placed closer to the sun gear than other circumferential surfaces thereof. This arrangement is achieved by installing the planetary gear in such a way that the small gear thereof is placed closer to the connecting section than the large gear, thereby permitting a reduction of the outside dimension of the movable means.

In addition, in the above arrangement of the document platen driving device, by rounding the sharp edges of the gear teeth of the second rack on the ends side of the semicircular gears and the sharp edges of the gear teeth of the semicircular gears on the ends side of the second rack, the following advantages can be obtained:
i) Since the planetary gear can smoothly move between the semicircular gears and the second rack, noise generation resulted from improper meshing during the movement therebetween is reduced.
ii) The teeth of the planetary gear and the semicircular gears can be prevented form being damaged due to an improper meshing between them.

Furthermore, in the above arrangement of the document platen driving device, the number of the teeth of the large gear of the planetary gear is set the same as that of the small gear. Thus, the relative positions of respective teeth for the large gear and the small gear are kept constant for all the teeth. For this reason, when the relative positions of the adjacent teeth of the semicircular gears and the second rack are set according to the relative positions of the respective teeth of the large gear and the small gear, the planetary gear is smoothly moved from the second rack to the semicircular gears (or from the semicircular gears to the second rack). Thus, a noise will not be generated when the planetary gear moves. The above arrangement also permits a quiet movement of the document platen. Furthermore, respective teeth of the planetary gear and the semicircular gears can be prevented from being damaged.

For a fuller understanding of the nature and advantages of the invention, reference should be made to the ensuing detailed description taken in conjunction with the accompanying drawings.

BRIEF DESCRIPTION OF THE DRAWING

FIGS. 1 through 16 are provided for illustrating the present invention in detail.

FIG. 1 is a view showing a schematic configuration of a document platen driving device in accordance with the present invention.

FIG. 2 is a schematic side view showing a copying machine that is provided with the document platen driving device.

FIG. 3 is a schematic perspective view showing reciprocal movements of the document platen of the copying machine.

FIG. 4 is a schematic side view showing a double gear in the document platen driving device.

FIG. 5 is an explanatory drawing showing an operational example of the document platen driving device.

FIG. 6 is an explanatory drawing showing an operational example of the document platen driving device: FIG. 6(a) is a schematic front view; and FIG. 6(b) is a schematic sectional side view.

FIG. 7 is a front view of a main portion showing one modified example of an endless rack of the document platen driving device.

FIG. 8 is an explanatory drawing showing one modified example of the double gear: FIG. 8(a) is a front view in a main portion; and FIG. 8(b) is a schematic side view.

FIG. 9, which shows a comparative example, is an explanatory drawing showing a state wherein the double gear and the endless rack are improperly meshed.

FIG. 10 is an enlarged view in a main portion of the endless rack.

FIG. 11 is an explanatory drawing showing a state wherein the double gear is moving between the second rack and the inner teeth section.

FIG. 12 is an explanatory drawing showing an operational example of one modified example of the document platen driving device.

FIG. 13 is an explanatory drawing showing another operational example of one modified example of the document platen driving device: FIG. 13(a) is a schematic front view of a main portion; and FIG. 13(b) is a schematic sectional side view.

FIG. 14 is an explanatory drawing showing one modified example of the double gear of FIG. 8: FIG. 14(a) is a front view.

FIG. 15 is a perspective view of a main portion of the document platen wherein the double gear is employed.

FIG. 16 is an explanatory drawing showing a state wherein the double gear of FIG. 8 and the endless rack are meshed.

FIG. 17 is a view showing a schematic configuration of a conventional copying machine.

FIG. 18 is a front view of a main part showing a reciprocal moving mechanism of a document platen of the copying machine.

DESCRIPTION OF THE EMBODIMENTS

The following description will discuss an embodiment of the present invention with reference to FIGS. 1 through 16.

Figure 2:
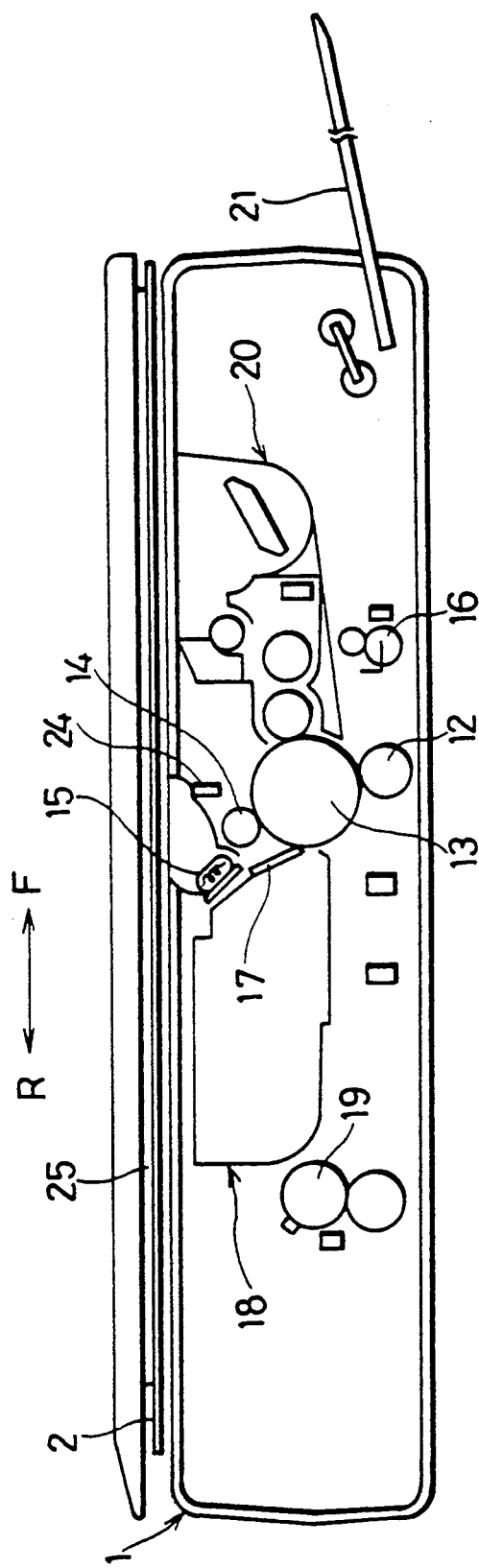

A document platen driving device of the present embodiment is designed for a copying machine incorporating a movable document platen. As shown in FIG. 2, the copying machine is composed of a substantially rectangular parallelopiped shaped main body 1 and a document platen 2 disposed above the main body 1. The document platen 2 is substantially rectangular shaped and is capable of moving with respect to the main body 1. The central portion of the document platen 2 is made of a transparent material such as glass, etc. A light emitted from a lamp 15 provided under the document platen 2, is projected onto a document 25 placed on the document platen 2. Further, a light reflected from the document 25 is projected onto a photoreceptor 13, provided so as to be freely rotatable, through a rod lens array 24.

Before the above exposing process is carried out, the surface of the photoreceptor 13 is uniformly charged by a charger 14 disposed so as to confront the photoreceptor 13. Then, the above exposing process is carried out so as to form a static latent image corresponding to an image on the document 25 on the surface of the photoreceptor 13.

Then, the static latent image is developed with a toner supplied from a developer 20, thereby forming a toner image corresponding to the static latent image on the photoreceptor 13. On the other hand, a sheet supplied from a feed section 21 is transported to the photoreceptor 13 through a register roller 16. Then, the toner image is transferred onto the sheet by a transfer unit 12 placed so as to confront the photoreceptor 13. Thereafter, the sheet is transported to a fuser 19. With an application of heat and pressure, the transferred toner image is made permanent on the sheet by the fuser 19. Then, the sheet is discharged out of the device by a sheet discharge means (not shown).

The toner which adheres to the transfer unit 12 after the toner image has been transferred onto the sheet is moved onto the photoreceptor 13 with an application of a voltage, having an opposite polarity to the toner, to the transfer unit 12. The toner moved onto the photoreceptor 13 by the transfer unit 12 is removed together with the toner remaining on the photoreceptor 13 by a cleaning unit 17 and collected by a toner collecting unit 18. After the transfer, the surface of the photoreceptor 13 is uniformly discharged using the light emitted from the lamp 15. Then, the photoreceptor 13 is set in a wait state until a next copying process is started.

Figure 1:
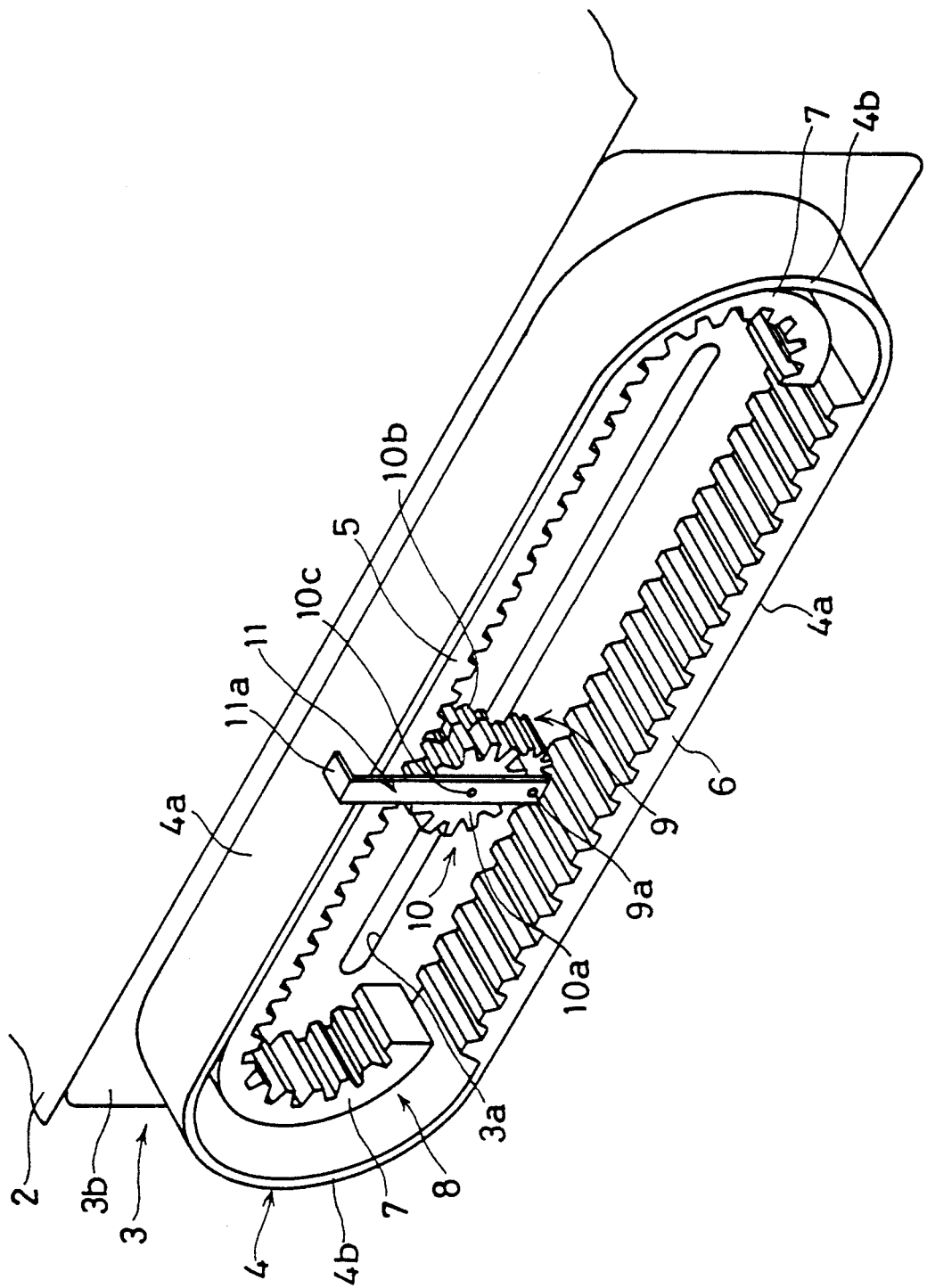
Figure 3:
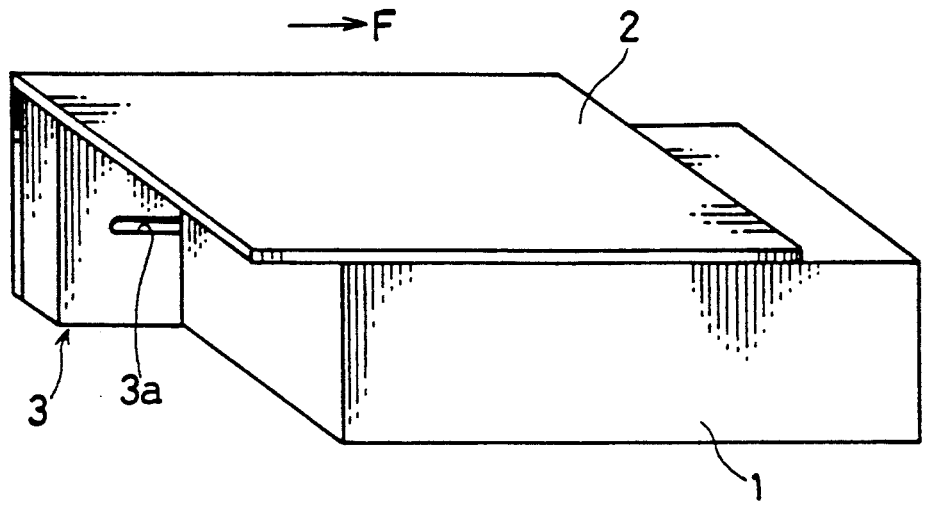

As shown in FIG. 3, a driving force transmitting unit 3 which serves as a document platen driving device in the copying machine is provided on one side of the main body 1. As shown in FIG. 1, the driving force transmitting unit 3 is provided with first and second racks 5 and 6 and an endless rack 8 composed of semicircular gears 7. The first rack and the second racks 5 and 6 are placed so that respective teeth face one another. Further, the semicircular gears 7 are provided so as to extend form both ends of the first rack 5 to respective ends of the second rack 6.

The endless rack 8 is provided on an inner circumference of a rectangular shaped support 4 (endless material). The support 4 having a smooth circumferential surface is composed of a pair of parallel plates 4a and a pair of curved plates 4b which link the pair of parallel plates 4a. The support 4 is provided on a plate 3b which is attached to the document platen 2.

A moving means is composed of the endless rack 8 and the support 4.

The plate 3b has a long guide hole 3a at the position parallel to the parallel plates 4a so as to have the same distance from both of the parallel plates 4a. A rotation shaft 9a of an output gear (sun gear) 9 for driving is fitted in the guide hole 3a.

Figure 4:
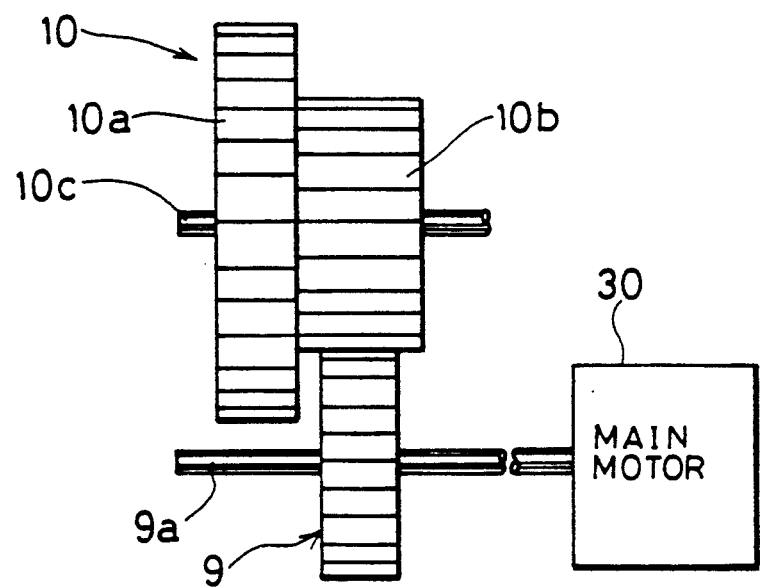
Figure 5B:
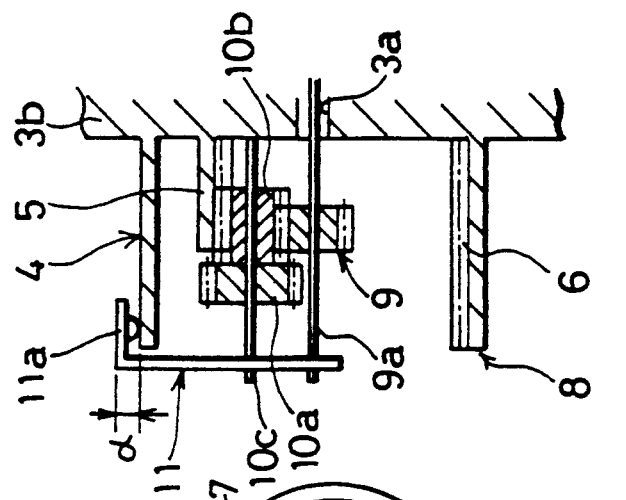
FIG. 5(b) is a schematic sectional side view.
Figure 5A:
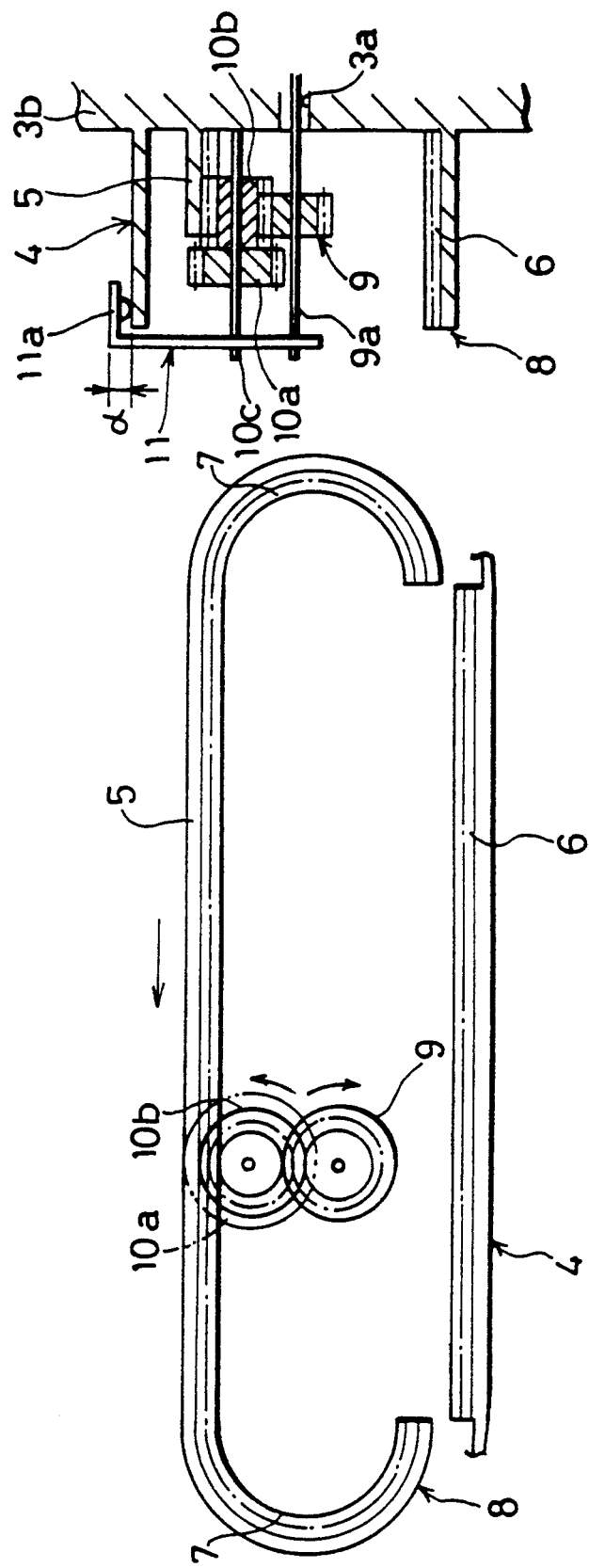
FIG. 5(a) is a schematic front view.

As shown in FIG. 4, the drive force transmitting unit 3 is provided with a double gear 10 (planetary gear). The double gear 10 is composed of a large gear 10a and a small gear 10b having different pitch circle diameters. The large gear 10a and the small gear 10b integrally rotate around the same rotation shaft 10c. As shown in FIGS. 5 and 6, the pitch circle diameter of the large gear 10a of the double gear 10 is set so as to mesh the first rack 5 with the semicircular gears 7. On the other hand, the pitch circle diameter of the small gear 10b is set so as to mesh with the second rack 6. Additionally, the double gear 10 and the endless gear 8 are formed so as to have the same precision. For example, the precision of the JIS fourth grade is adopted in the present embodiment. The double gear 10 and the endless rack 8 are formed to be involute teeth.

As shown in FIG. 5, the guide hole 3a is positioned so that the distance from the pitch point of the first rack 5 is the distance of adding the pitch circle diameter of the output gear 9 for driving and the pitch circle diameter of the small gear 10b. The guide hole 3a is also positioned so that the distance from the pitch point of the second rack 6 is the distance of adding the pitch circle diameter of the output gear 9 for driving, the pitch circle diameter of the small gear 10b, and the pitch circle diameter of the large gear 10a.

The rotation shafts 9a and 10c are supported by a connecting plate 11 (connecting member) so as to be freely rotatable. Further, a bent piece 11a (sliding piece) is formed at one end of the connecting plate 11 so as to have a right angle with respect to the direction of the plate 3b. The bent piece 11a is designed so as to slide along the circumferential surface of the support 4. With this arrangement, the double gear 10 surely meshes with the output gear 9 for driving and the endless rack 8.

The bent piece 11a is provided with a dome-shaped contact piece (frictional force reducing member) made of a material having a small coefficient of friction so that the bent piece 11a can smoothly slide along the circumferential surface of the support 4. The contact piece is preferably made of a resin such as fluorocarbon polymers. For the frictional force reducing member provided with the bent piece 11a, a ball bearing (rolling member) which rotates along the circumferential surface of the support 4 may be used other than the above contact piece.

Furthermore, a frictional force reducing film made of a material having a small coefficient of friction is preferably formed also on a circumferential surface of the support 4. Especially for a frictional force reducing film, a resin such as fluorocarbon polymers is preferably used.

With the above arrangement, the rotation shaft 9a of the output gear 9 for driving inserted into the guide hole 3a so as to enable the reciprocating movement of the endless rack 8 with respect to the output gear 9 for driving which is attached to the endless rack 8 so as to be rotatable. With the reciprocating movement of the endless rack 8, the document platen 2, which is connected to the endless rack 8, also reciprocates. Furthermore, a driving force of a main motor (driving force generation means) shown in FIG. 4 is transmitted to the rotation shaft 9a via a driving force transmitting mechanism (not shown).

According to the copying machine adopted in the present invention, in one copying process, the transfer sheet whereon the document image has been copied passes through the fuser 19, and is discharged out of the main body 1 before the document platen 2 moves back to the original stand-by position.

The processes of the device having the arrangement of the present embodiment will be described next through the case wherein the small gear 10b of the double gear 10 meshes with the first rack 5.

When the driving force of the main motor 30 is input to the rotation shaft 9a of the output gear 9 for driving, the output gear 9 starts rotating. With the rotation of the output gear 9 for driving, the double gear 10 rotates in an opposite direction to the rotation direction of the output gear 9 for driving.

In this state, the bent piece 11a, which is formed at one end of the connecting plate 11 for supporting the rotation shaft 10c of the output gear 9 for driving and the double gear 10 so as to be freely rotatable, slides along the circumferential surface of the support 4. The endless rack 8 is linearly moved with the rotation of the double gear 10. With the movement of the endless rack 8, the document platen 2 connected to the endless rack 8 is linearly moved in a predetermined direction.

Thereafter, when the output gear 9 for driving is rotatably driven in the same direction, the small gear 10b of the double gear 10 meshes with the semicircular gears 7 in replace of the first rack 5. The small gear 10b rotates along the output gear 9 for driving at substantially 180° so that the respective positions of the output gear 9 for driving and the double gear 10 become upside dow while the endless rack 8 is in stoppage.

When the small gear 10b reaches the semicircular gears 7, the meshing state between the small gear 10b and the semicircular gears 7 is cancelled. Here, the second rack 6 is displaced outside the first rack 5, or the second rack 6 is formed wider than the first rack 5 to be parallel to the rotation shaft 10c. Further, when the meshing state of the small gear 10b and the semicircular gears 7 is cancelled, the large gear 10a immediately meshes with the second rack 6. Therefore, when the output gear 9 for driving is rotatably driven in the same direction, the endless rack 8 is moved in an opposite direction to the above direction. With the movement of the endless rack 8, the document platen 2 is moved in an opposite direction to the previous direction.

As described, in the driving force transmitting unit 3 having the above arrangement, the double gear 10 is used as a planetary gear in order to obtain a reciprocating movement of the document platen 2. This permits the elimination of the components of the device which are required in the conventional model, such as various gears, latches, and solenoids, thereby reducing the manufacturing cost of the copying machine.

When the document platen 2 is moved by meshing the small gear 10b with the endless rack 8, the moving direction of the document platen 2 is set forward for reading out by scanning the document 25 by the optical system. On the other hand, when the document platen 2 is moved by meshing the large gear 10a with the endless rack 8, the moving direction of the document 25 is set backward, i.e, moving from the stand-by position to the copying start position or from the copying end position to the copying start position. In this way, the backward moving speed of the document platen 2 can be set faster than the forward moving speed of the document platen 2.

In the copying machines, in order to ensure the copying quality, there is a limit in increasing the transport speed and the transfer speed of the sheets in the copying machines, and thus there is a limit in increasing the forward moving speed of the document platen 2. However, there is no limit in increasing the backward moving speed of the document platen 2. Thus, even if the backward moving speed is set faster than the forward moving speed, it would not affect the copying quality. Therefore, by setting the backward moving speed faster than the forward moving speed, when the copying process is to be started, the document platen 2 can be promptly moved to the copying start position, thereby reducing the time required for the entire copying process. Especially when carrying out the successive copying process, since the document platen 2 can be promptly moved from the copying end position to the copying start position, the time required for the entire copying process can be still reduced.

In the conventional models, when the document platen reciprocates, in order to vary the speeds of the document platen between the forward movement and the backward movement, a switching means such as a clutch is used for varying the rotation speed of the output gear for driving. With the arrangement of the present embodiment, the switching means such as a clutch can be eliminated, thereby permitting the reduction of the manufacturing cost.

With the arrangement of the present embodiment, the precision of JIS fourth grade is adopted for forming the double gear 10 and the endless rack 8. However, for the reasons described below, the lower grade may be adopted for forming the second rack 6 of the endless rack 8 and the large gear 10a of the double gear 10. When the document platen 2 is moved forward, if the moving speed becomes unstable, it would adversely affect the copying quality.

In order to avoid this, a high precision is required for forming the first rack 5 and the small gear 10b which are associated with the forward movement of the document platen 2. On the other hand, when forming the second rack 6, the semicircular gears 7, and the large gear 10a which are associated with the backward movement of the document platen 2, the required precision is not as high as the precision required for forming the above components for forward movement. Therefore, when forming the second rack 6, the semicircular gears 7, and the large gear 10a, even if the precision of JIS sixth grade is adopted, it would not create any problems.

As a result, the manufacturing cost can be significantly reduced by adopting a lower precision for forming the components associated with the backward movement, compared with the case where a high precision is required for forming all the gears. Especially when forming a large component such as the endless rack 8, since a high precision is not required for a mold for forming the large component, etc., the manufacturing cost can be significantly reduced.

In the arrangement of the present embodiment, the first rack 5 forms an upper portion of the endless rack 8, and the second rack 6 forms a lower portion of the endless rack 8 so that the large gear 19a of the double gear 10 meshes with the second rack 6. However, the relative positions of the first rack 5 and the second rack 6 are not limited to the above. For example, the arrangement may be made such that the first rack 5 forms the lower portion of the endless rack 8, and the second rack 6 forms the upper portion of the endless rack 5 as shown in FIG. 7.

The large gear 10a associated with the backward movement of the document platen 2 meshes with the first rack 5 and the semicircular gears 7, and this arrangement has the following advantages. Since the large gear 10a also meshes with the semicircular gears 7, the stopping time of the document platen 2 for changing the moving direction thereof from forward to backward can be reduced. As a result, the time required for the entire copying process or the time required for the entire successive copying process can be still reduced.

Additionally, when a commonly used involute gear with sharp edges is adopted for each gear, when the double gear 10 is moved from the second rack 6 to the semicircular gears 7, the addenda of the double gear 10 and the addenda of the semicircular gears 7 hit each other due to the edges of the teeth. Thus, the double gear 10 may not properly mesh with the semicircular gears 7. When respective addenda hit each other without being properly meshed, the noise would be generated. Furthermore, a large amount of stress is exerted on the respective addenda of the semicircular gears 7 and the double gear 10, and the rotation shaft 10c of the double gear 10, and thus these components may be damaged.

Figure 7:
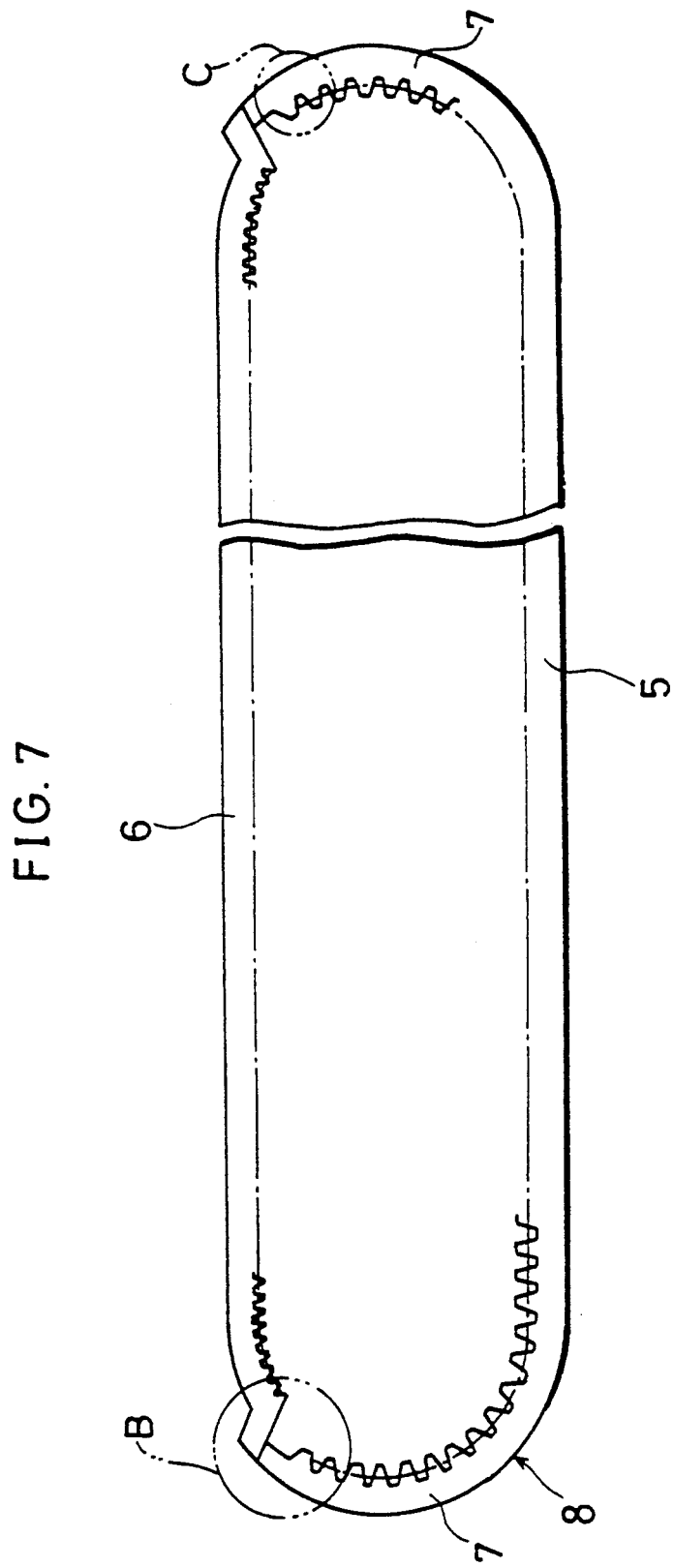
Figure 10A:
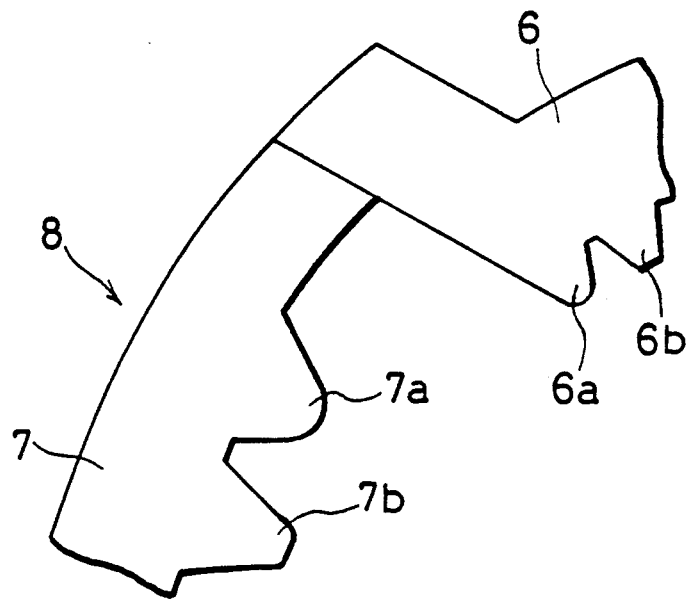
FIG. 10(a) is an enlarged view of circle B of FIG. 7.
Figure 10B:
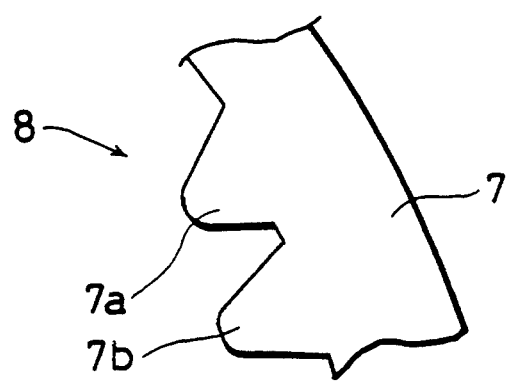
FIG. 10(b) is an enlarged view of circle C of FIG. 7.

As shown in FIG. 10(a) which is an enlarged view of the portion in the circle B of FIG. 7, and in FIG. 10(b) which is an enlarged view of the portion in the circle C of FIG. 7, the respective shapes of the tooth 7a of the semicircular gears 7 and the tooth 6a of the second rack 6, which are adjacent one another, are changed from the respective shapes of the tooth 7b and the tooth 6b (involute gear) by rounding the sharp edges thereof. The tooth 7a and the tooth 6a may be formed by trial-and-error, or may be formed by changing the shape of the tooth at the ends of the semicircular gears 7 and the second rack 6 so as to prevent them form hitting one another without being properly meshed by simulating the movement of the double gear 10 between the second rack 6 and the semicircular gears 7 on the screen of CAD (Computer-Aided-Design).

Figure 11A:
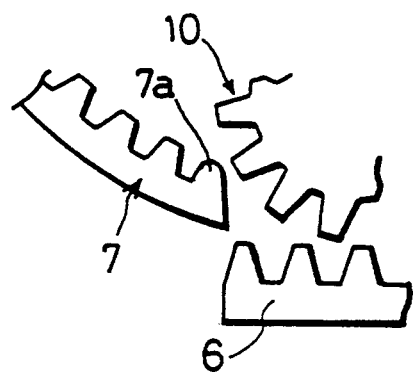
Figure 11B:
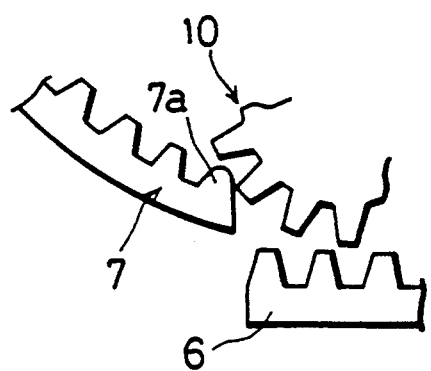

With this arrangement, as shown in FIGS. 11(a) and (b), when the double gear 10 in FIG. 1 is moved from the second rack 6 to the semicircular gears 7, as the addenda of the tooth 7a is formed to be rounded, the double gear 10 and the semicircular gears 7 can be prevented from being improperly engaged. Therefore, the noise from the respective addenda generated by hitting one another can be eliminated, thereby permitting a quiet movement of the document platen 2. Moreover, the respective teeth of the double gear 10 and the semicircular gears 7, and the rotation shaft 10c of the double gear 10 can be prevented from being damaged.

Figure 12B:
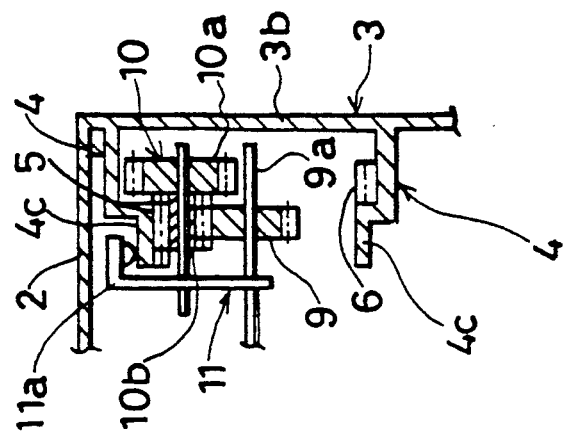
FIG. 12(b) is a schematic sectional side view.
Figure 12A:
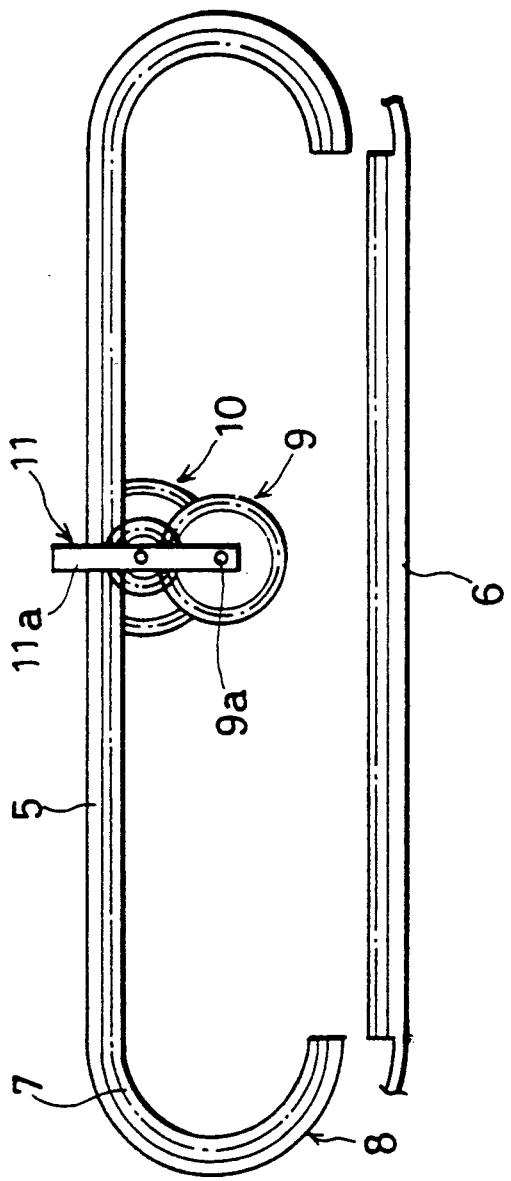
FIG. 12(a) is a schematic front view in a main portion.

In the above arrangement of the present embodiment, the large gear 10a is provided closer to the connecting plate 11 than the small gear 10b as shown in FIG. 5. However, the respective positions of the large gear 10a and the small gear 10b are not limited to the above positions. For example, the small gear 10b may be provided closer to the connecting plate 11 than the large gear 10a as shown in FIG. 12, and this positioning has the following advantages.

Namely, the large gear 10a is placed on the side of the plate 3b whereon the support 4 is connected, and the small gear 10b whose pitch circle diameter is shorter than that of the large gear 10a is placed on the side of the end portion of the support 4. In this way, the support 4 is formed in such a step like manner that the end portion thereof is closer to the rotation shaft 9a than the portion thereof on the side of the plate 3a. In this case, a circumferential surface 4c of the end portion of the support 4 is in sliding contact with the bent piece 11a of the connecting plate 11.

In the case where the large gear 10a is provided closer to the connecting plate 11 than the small gear 10b, the step of the support 4 cannot be formed as shown in FIGS. 5 and 6. Therefore, in order to achieve the smooth sliding of the bent piece 11a of the connecting plate 11 along the circumferential surface of the support 4, a space having the distance $\alpha$ from the circumferential surface of the support 4 is required to be maintained.

Figure 14:
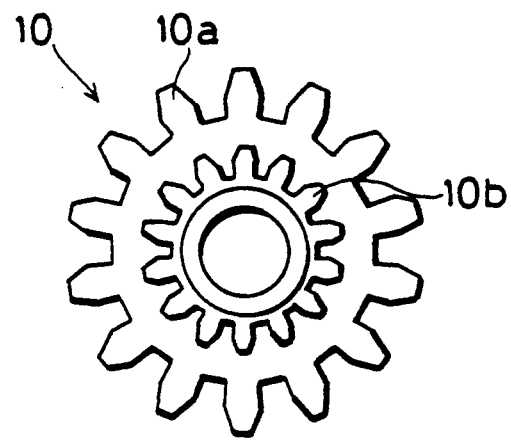
Figure 14B:
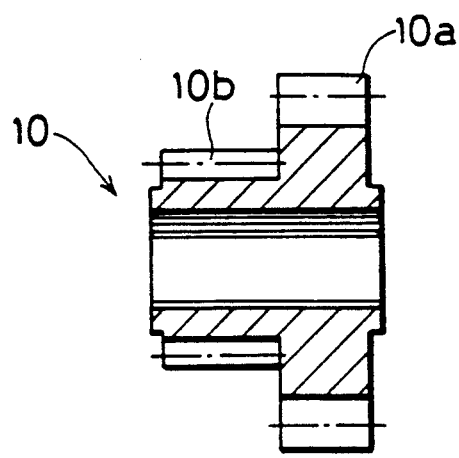
FIG. 14(b) is a sectional view.
Figure 16:
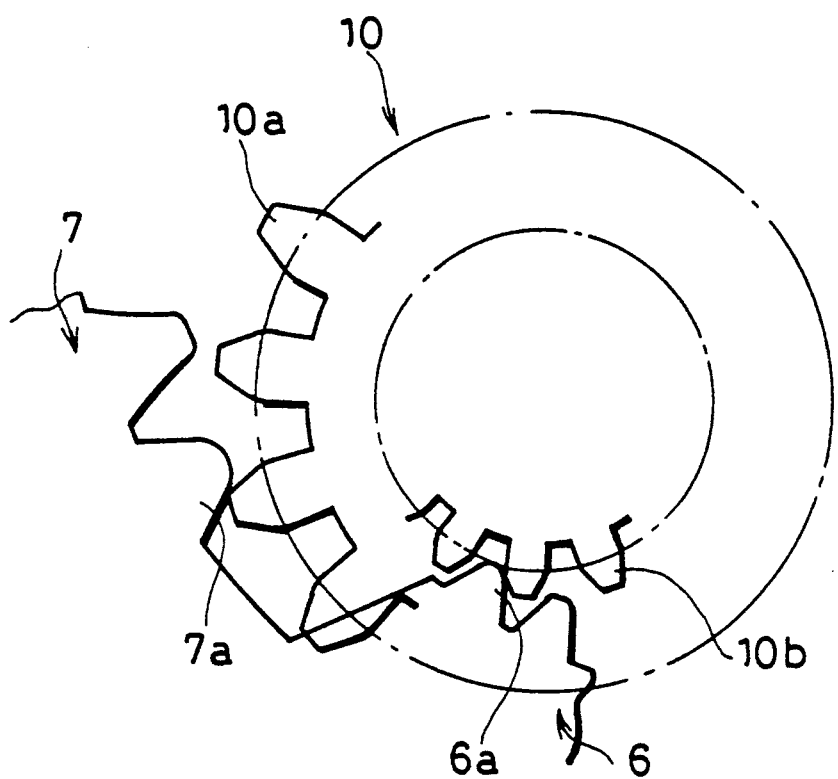
Figure 17:
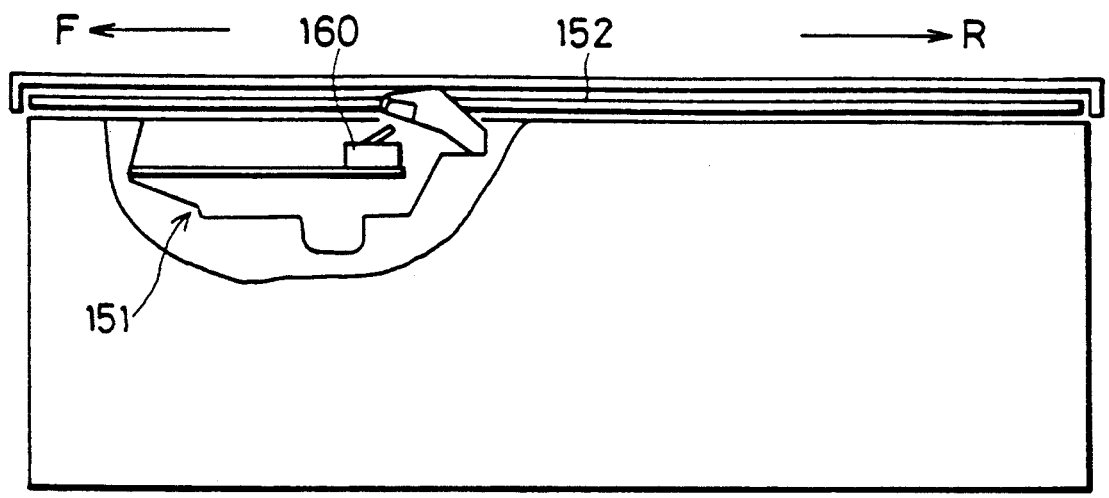
FIGS. 17 and 18 show the prior art.
Figure 18:
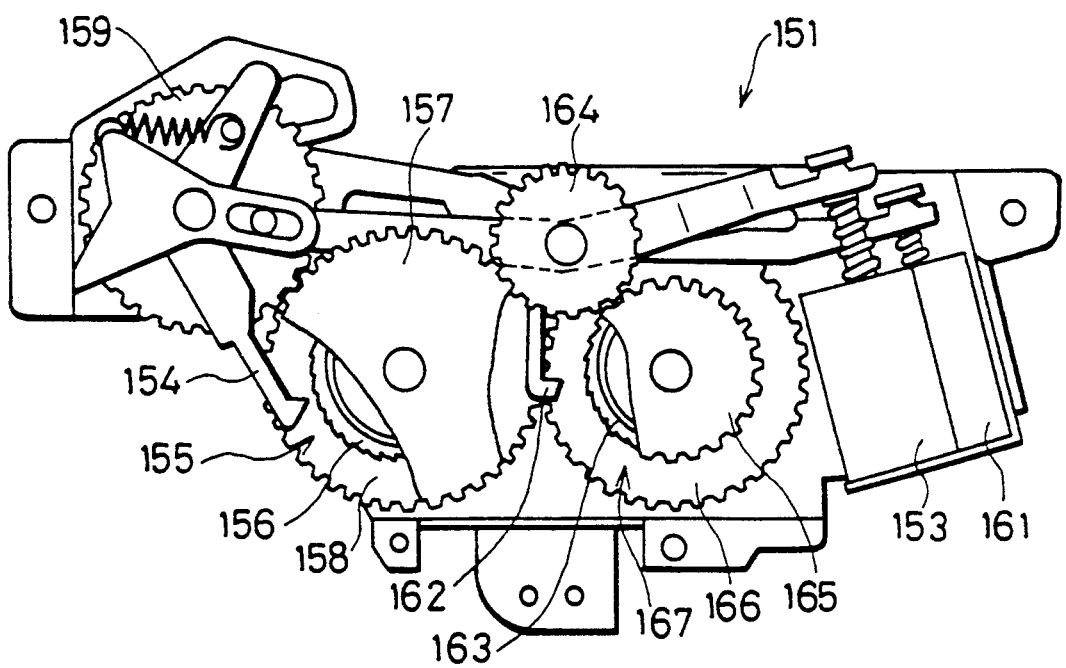

On the other hand, in the arrangement shown in FIGS. 13 and 14, the sliding position of bent piece 11a can be set closer to the rotation shaft 9a compared with the arrangement shown in FIG. 5. Thus, the required space surrounding the circumferential surface of the support 4 can be reduced or even eliminated. As a result, the driving force transmitting unit 3 can be made smaller, thereby permitting a compact size copying machine by adopting the driving force transmitting unit 3 having the above configuration.

Additionally, the respective numbers of teeth for the large gear 10a and the small gear 10b of the double gear 10 are not specified in the present embodiment. However, the respective numbers of teeth are preferably set equal as shown in FIG. 14. In the figure, the module of the large gear 10a and the module of the gear 10b are respectively set 1.105 and 0.65, and the number of teeth is set fourteen. However, the modules and the number of teeth for the large gear 10a and the small gear 10b are not specified. Additionally, in the case where the respective modules for the large gear 10a and the small gear 10b are set as described above, the module for the first rack 5 and the semicircular gears 7, corresponding to the large gear 10a, is required to be set 1.105. Similarly, the module of the second rack 6 corresponding to the small gear 10b is required to be set 0.65.

Figure 8:
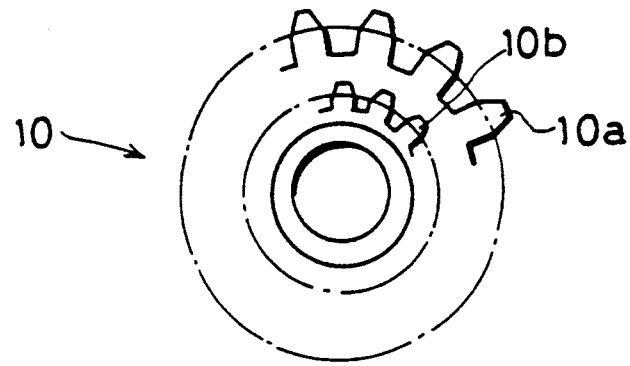
Figure 8:
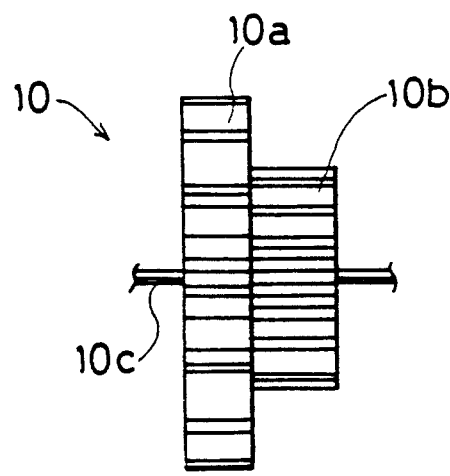
Figure 9A:
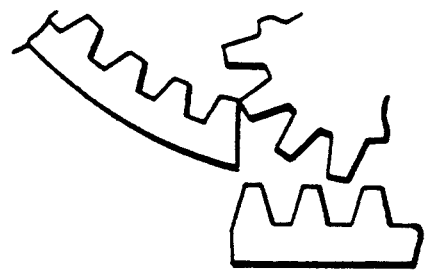
Figure 9B:
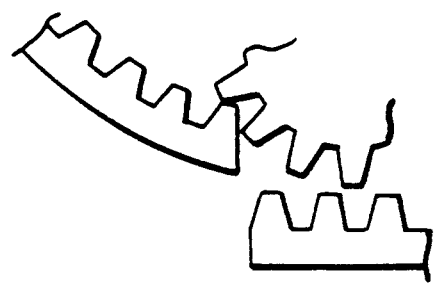

However, as long as the respective numbers of teeth for the large gear 10a and the small gear 10b are equal, the relative positions between them are not specified. Namely, as shown in FIG. 14, the respective positions may be set so that the directions of respective addenda for the large gear 10a and the small gear 10b are aligned, or may be set so that the addenda of the small gear 10b corresponds to the teeth bottoms of the large gear 10a as shown in FIG. 8.

To be compared, the following will discuss the case where the number of teeth for the large gear of the double gear differs from the number of teeth for the small gear of the double gear. In this case, the smooth movement of the double gear between the second rack and the semicircular gears would be disturbed, thereby making a noise. Moreover, the large stress is exerted on the respective addenda for the semicircular gears and the double gear, and the teeth of the respective gears may be damaged.

However, as shown in FIG. 14, in the case where the respective numbers of teeth for the large gear 10a and the small gear 10b are set equal, the relative positions between the teeth of the large gear 10a and the small gear 10b are equal for all the teeth. Therefore, if the relative positions of the tooth 7a of the semicircular gears 7 and the tooth 6a of the second rack 6 which are adjacent one another are set according to the relative positions for the large gear 10a and the small gear 10b, for example, when the double gear 10 is moved from the second rack 6 to the semicircular gears 7, the relative positions of the tooth 7a of the semicircular gears 7 and the tooth of the large gear 10a can be maintained constant irrespective of the change in the positions of the tooth 6a of the second rack 6 and the tooth of the small gear 10b. Similarly, when the double gear 10 is moved from the semicircular gears 7 to the second rack 6, the relative positions of the tooth 6a of the second rack 6 and the teeth of the small gear 10b, and the relative positions of the tooth 7a of the semicircular gears 7 and the teeth of the large gear 10a can be always maintained constant. With this arrangement, the double gear 10 can be smoothly moved from the second rack 6 to the semicircular gears 7 (or from the semicircular gears 7 to the second rack 6), without generating a noise, thereby permitting a quiet movement of the document platen 2. Moreover, the double gear 10 and the semicircular gears 7 can be prevented from being damaged.

As described, the document platen driving device of the present embodiment for reciprocating the document platen whereon a document is placed is provided with movable means connected to the document platen, which includes an endless rack and an endless member, the endless rack having first and second racks that extend in parallel to a moving direction of a document platen, and two semicircular gears that are connected to respective ends of the first rack so that they extend in a circular manner from the ends to respective ends of the second rack, the endless member having a smooth circumferential surface and surrounding the endless rack; driving force generating means for generating a driving force to move the document platen; a sun gear for transmitting the driving force of the driving force generating means to the document platen, the sun gear being secured to a fixed station within a space surrounded by an endless rack; a planetary gear having a large gear and a small gear having different pitch circle diameters, which is disposed so as to coaxially rotate as one integral part, the planetary gear meshing with the endless rack and also with the sun gear so as to revolve around the sun gear; and a connecting member for supporting and connecting ends of the respective rotation shafts of the sun gear and the planetary gear, the connecting member being provided with a sliding section which slides along the circumferential surface of the endless member with the movement of said movable means.

As described above, the above arrangement permits a reciprocating movement of the document platen, i.e., a forward movement and a backward movement, by the planetary gear mechanism. This enables an elimination of the necessity of a large number of parts, such as gears, latches, and solenoids, as well as a reduction of the manufacturing cost of the device.

Furthermore, it is arranged such that the forward moving direction of the document platen is set the direction in which the movable means is moved by meshing one of the first rack and the second rack with the small gear having a smaller pitch circle diameter than that of the large gear; and the backward moving direction of the document platen is set the direction in which the movable means is moved by meshing the other of the first rack and the second rack with the large gear having a larger diameter than that of the small gear. With this arrangement, the backward moving speed of the document platen can be made faster than the forward moving speed of the document platen, thereby permitting a reduction of the entire time required for the copying process, especially for the successive copying process.

Furthermore, since the precision of the moving speed is negligible with respect to the backward movement of the document platen, the precision of the large gear, which is associated with the backward movement of the document platen, can be reduced in comparison with the precision of the small gear, which is associated with the forward movement of the document platen, thereby permitting a reduction of the manufacturing cost of the planetary gear.

Moreover, in the above arrangement of the document platen, the planetary gear is designed such that the small gear is placed closer to the connecting member than the large gear. Thus, the endless member can be formed in such a step-like manner that a circumferential surface of the endless member along which a sliding member slides is placed closer to the sun gear than other circumferential surfaces thereof. This arrangement is achieved by installing the planetary gear in such a way that the small gear thereof is placed closer to the connecting section than the large gear, thereby permitting a reduction of the outside dimension of the movable means.

In addition, in the above arrangement of the document platen driving device, by rounding the sharp edges of the gear teeth of the second rack on the ends side of the semicircular gears and the sharp edges of the gear teeth of the semicircular gears on the ends side of the second rack, the following advantages can be obtained:

i) Since the planetary gear can smoothly move between the semicircular gears and the second rack, noise generation resulted from improper meshing during the movement therebetween is reduced.

ii) The teeth of the planetary gear and the semicircular gears can be prevented form being damaged due to an improper meshing between them.

Furthermore, in the above arrangement of the document platen driving device, the number of the teeth of the large gear of the planetary gear is set the same as that of the small gear. Thus, the relative positions of respective teeth for the large gear and the small gear are kept constant for all the teeth. For this reason, when the relative positions of the adjacent teeth of the semicircular gears and the second rack are set according to the relative positions of the respective teeth of the large gear and the small gear, the planetary gear is smoothly moved from the second rack to the semicircular gears (or from the semicircular gears to the second rack). Thus, a noise will not be generated when the planetary gear moves. The above arrangement also permits a quiet movement of the document platen. Furthermore, respective teeth of the planetary gear and the semicircular gears can be prevented from being damaged.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A document platen driving device for reciprocally moving a document platen whereon a document is placed, comprising:

movable means connected to the document platen, which includes an endless rack and an endless member, the endless rack having first and second racks that extend in parallel to a moving direction of a document platen, and two semicircular gears that are connected to respective ends of the first rack so that they extend in a circular manner from the ends to respective ends of the second rack, the endless member having a smooth circumferential surface and surrounding the endless rack;

driving force generating means for generating a driving force to move the document platen;

a sun gear for transmitting the driving force of the driving force generating means to the document platen, the sun gear being secured to a fixed station within a space surrounded by an endless rack;

a planetary gear having a large gear and a small gear having different pitch circle diameters, which is disposed so as to coaxially rotate as one integral part, the planetary gear meshing with the endless rack and also with the sun gear so as to revolve around the sun gear; and a connecting member for supporting and connecting ends of the respective rotation shafts of the sun gear and the planetary gear, the connecting member being provided with a sliding section which slides along the circumferential surface of the endless member with the movement of said movable means.

2. A document platen driving device as set forth in claim 1, wherein the first rack and the second rack are installed in a shifted manner toward the rotation shaft of the planetary gear such that the large gear meshes with one of the first rack and the second rack while the small gear meshes with the other of the first rack and the second rack.

3. The document platen driving device as set forth in claim 1, wherein the sliding section of the connecting member includes a frictional force reducing member for reducing a frictional force that is exerted between the sliding section and the circumferential surface of the endless member.

4. The document platen driving device as set forth in claim 3, wherein the frictional force reducing member is made of a resin having a small friction coefficient.

5. The document platen driving device as set forth in claim 4, wherein the frictional force reducing member is substantially formed in a dome shape.

6. The document platen driving device as set forth in claim 3, wherein the frictional force reducing member includes a rolling member for rolling along the circumferential surface of the endless member.

7. The document platen driving device as set forth in claim 6, wherein said rolling member is composed of a ball bearing.

8. The document platen driving device as set forth in claim 1, wherein:

the forward moving direction of the document platen is set the direction in which the movable means is moved with one of the first rack and the second rack meshing with the small gear having a smaller pitch circle diameter than that of the large gear; and the backward moving direction of the document platen is set the direction in which the movable means is moved with the other of the first rack and the second rack meshing with the large gear having a larger pitch circle diameter than that of the small gear.

9. The document platen driving device as set forth in claim 8, wherein a precision for forming the large gear is lower than that of the small gear.

10. The document platen driving device as set forth in claim 9, wherein the endless rack includes a first portion meshing with the large gear and a second portion that meshing with the small gear, a precision of forming the first portion being lower than a precision of forming the second portion.

11. The document platen driving device as set forth in claim 8, wherein the semicircular gears mesh with the large gear.

12. The document platen driving device as set forth in claim 1, wherein the edges of the gear teeth of the second rack on the ends side of the semicircular gears and the edges of the gear teeth of the semicircular gears on the side of the second rack are rounded without having sharp edges.

13. The document platen driving device as set forth in claim 1, wherein the planetary gear is designed such that the small gear is placed closer to the connecting member than the large gear.

14. The document platen driving device as set forth in claim 13, wherein the endless member is designed in such a step-like manner that a circumferential surface thereof along which the sliding section slides is placed closer to the sun gear than any other circumferential surface thereof.

15. The document platen driving device as set forth in claim 1, wherein the number of teeth of the large gear of the planetary gear is the same as that of the small gear.

16. A document platen driving device for reciprocally moving a document platen whereon a document is placed, comprising:

movable means connected to the document platen, which includes an endless rack and an endless member, the endless rack having first and second racks that extend in parallel to a moving direction of a document platen, and two semicircular gears that are connected to respective ends of the first rack so that they extend in a circular manner from the ends to respective ends of the second rack, the endless member having a smooth circumferential surface and surrounding the endless rack;

driving force generating means for generating a driving force to move the document platen;

a sun gear for transmitting the driving force of the driving force generating means to the document platen, the sun gear being secured to a fixed station within a space surrounded by the endless rack; and a planetary gear including a large gear meshing with the first rack and semicircular gears and a small gear meshing with the second rack, which have different pitch circle diameters and integrally rotates around an axis, the pitch circle diameter of the small gear being smaller than that of the large gear, said planetary gear revolving around the sun gear by meshing with said sun gear; and a connecting member for supporting and connecting respective ends of the rotation shafts of the sun gear and the planetary gear, the connecting member being provided with a sliding section that slides along the circumferential surface of the endless member with the movement of said movable means, wherein the planetary gear is installed in such a manner that the small gear is placed closer to the connecting member side than the large gear; the number of teeth of the large gear of the planetary gear is the same as that of the small gear;

a precision of forming the large gear is lower than that of the small gear; and the edges of the gear teeth of the second rack on the ends side of the semicircular gears and the edges of the gear teeth of the semicircular gears on the side of the second rack are rounded without having sharp edges.

* * * * *